United States Patent
Nguyen

(10) Patent No.: US 6,769,069 B1
(45) Date of Patent: Jul. 27, 2004

(54) SERVICE PROCESSOR CONTROL OF MODULE I / O VOLTAGE LEVEL

(75) Inventor: Hoa Cong Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 09/692,338

(22) Filed: Oct. 19, 2000

(51) Int. Cl.[7] .............................................. G06F 1/26
(52) U.S. Cl. ........................... 713/300; 713/340; 710/1; 702/64
(58) Field of Search ............................. 710/1; 702/64; 713/300, 340

(56) References Cited

U.S. PATENT DOCUMENTS

| | | | | |
|---|---|---|---|---|
| 4,890,013 A | * | 12/1989 | Arcus | 327/53 |
| 5,319,370 A | * | 6/1994 | Signore et al. | 341/120 |
| 5,444,298 A | * | 8/1995 | Schutz | 257/691 |
| 5,617,176 A | * | 4/1997 | Matsuzawa et al. | 396/55 |
| 5,828,892 A | * | 10/1998 | Mizuta | 713/300 |
| 6,075,687 A | * | 6/2000 | Cheng et al. | 361/91.1 |
| 6,118,384 A | * | 9/2000 | Sheldon et al. | 340/636 |
| 6,516,381 B1 | * | 2/2003 | Hamilton et al. | 711/105 |

* cited by examiner

Primary Examiner—Jeffrey Gaffin
Assistant Examiner—Justin Knapp
(74) Attorney, Agent, or Firm—Duke W. Yee; Mark E. McBurney; Wayne P. Bailey

(57) ABSTRACT

A method, system, and computer program for updating a reference voltage for a interface chip to a component of a data processing system is provided. In one embodiment, a service processor reads the voltage requirements from a vital product data (VPD) module for each component within the data processing system and determines whether the voltage requirement for any component differs from a default voltage value. If any component has a voltage requirement that differs from the default value, then the service processor sends a signal to a JTAG controller or voltage selector within the interface chip corresponding to the affected component changing a register bit that results in the Input/Output drivers group corresponding to the affected component using a reference voltage that matched the requirements of the component rather than the default reference voltage.

15 Claims, 4 Drawing Sheets

FIG. 3

NODE CONTROLLER DATA (NCD) CHIP

| JTAG CONTROLLER OPTION REGISTER BIT | KNOWN AS NCD REGISTER SLCTDOL BIT | COMPONENT IO GROUP/SIGNALS | "0" SCAN-IN FOR OUTPUT VOLTAGE | "1" SCAN-IN FOR OUTPUT VOLTAGE |
|---|---|---|---|---|
| 191 | 0 | PROCESSOR 0 SIGNALS GROUP | 2.5V | 1.8V |
| 192 | 1 | PROCESSOR 1 SIGNALS GROUP | 2.5V | 1.8V |
| 193 | 2 | PROCESSOR 2 SIGNALS GROUP | 2.5V | 1.8V |
| 194 | 3 | PROCESSOR 3 SIGNALS GROUP | 2.5V | 1.8V |
| 195 | 4 | SECONDARY CHECKSTOP BIT 0 | 2.5V | 1.8V |
| 196 | 5 | SECONDARY CHECKSTOP BIT 1 | 2.5V | 1.8V |
| 197 | 6 | SECONDARY CHECKSTOP BIT 2 | 2.5V | 1.8V |
| 198 | 7 | SECONDARY CHECKSTOP BIT 3 | 2.5V | 1.8V |
| 199 | 8 | SECONDARY CHECKSTOP BIT 4 | 2.5V | 1.8V |
| 198 | 9 | SECONDARY CHECKSTOP BIT 5 | 2.5V | 1.8V |
| 199 | 10 | HARDWARE RESET BIT 0 | 2.5V | 1.8V |
| 200 | 11 | HARDWARE RESET BIT 0 | 2.5V | 1.8V |
| 201 | 12 | HARDWARE RESET BIT 0 | 2.5V | 1.8V |
| 202 | 13 | HARDWARE RESET BIT 0 | 2.5V | 1.8V |

FIG. 4

NODE CONTROLLER ADDRESS (NCA) CHIP

| JTAG CONTROLLER OPTION REGISTER BIT | KNOWN AS NCA REGISTER SLCTDOL BIT | COMPONENT IO GROUP/SIGNALS | "0" SCAN-IN FOR OUTPUT VOLTAGE | "1" SCAN-IN FOR OUTPUT VOLTAGE |
|---|---|---|---|---|
| 191 | 0 | PROCESSOR 0 SIGNALS GROUP | 2.5V | 1.8V |
| 192 | 1 | PROCESSOR 1 SIGNALS GROUP | 2.5V | 1.8V |
| 193 | 2 | PROCESSOR 2 SIGNALS GROUP | 2.5V | 1.8V |
| 194 | 3 | PROCESSOR 3 SIGNALS GROUP | 2.5V | 1.8V |

| JTAG CONTROLLER OPTION REGISTER BIT | KNOWN AS ASX REGISTER SLCTDOL BIT | COMPONENT IO GROUP/SIGNALS | "0" SCAN-IN FOR OUTPUT VOLTAGE | "1" SCAN-IN FOR OUTPUT VOLTAGE |
|---|---|---|---|---|
| 191 | 0 | NODE0/PROCESSOR 0 GROUP | 2.5V | 1.8V |
| 192 | 1 | NODE0/PROCESSOR 1 GROUP | 2.5V | 1.8V |
| 193 | 2 | NODE0/PROCESSOR 2 GROUP | 2.5V | 1.8V |
| 194 | 3 | NODE0/PROCESSOR 3 GROUP | 2.5V | 1.8V |
| 195 | 4 | NODE1/PROCESSOR 0 GROUP | 2.5V | 1.8V |
| 196 | 5 | NODE1/PROCESSOR 1 GROUP | 2.5V | 1.8V |
| 197 | 6 | NODE1/PROCESSOR 2 GROUP | 2.5V | 1.8V |
| 198 | 7 | NODE1/PROCESSOR 3 GROUP | 2.5V | 1.8V |
| 199 | 8 | NODE2/PROCESSOR 0 GROUP | 2.5V | 1.8V |
| 200 | 9 | NODE2/PROCESSOR 1 GROUP | 2.5V | 1.8V |
| 201 | 10 | NODE2/PROCESSOR 2 GROUP | 2.5V | 1.8V |
| 202 | 11 | NODE2/PROCESSOR 3 GROUP | 2.5V | 1.8V |
| 203 | 12 | NODE3/PROCESSOR 0 GROUP | 2.5V | 1.8V |
| 204 | 13 | NODE3/PROCESSOR 1 GROUP | 2.5V | 1.8V |
| 205 | 14 | NODE3/PROCESSOR 2 GROUP | 2.5V | 1.8V |
| 206 | 15 | NODE3/PROCESSOR 3 GROUP | 2.5V | 1.8V |
| 207 | 16 | NODE4/PROCESSOR 0 GROUP | 2.5V | 1.8V |
| 208 | 17 | NODE4/PROCESSOR 1 GROUP | 2.5V | 1.8V |
| 209 | 18 | NODE4/PROCESSOR 2 GROUP | 2.5V | 1.8V |
| 210 | 19 | NODE4/PROCESSOR 3 GROUP | 2.5V | 1.8V |
| 211 | 20 | ASX_0_EN | 2.5V | 1.8V |
| 212 | 21 | ASX_1_EN | 2.5V | 1.8V |
| 213 | 22 | NODE0/NCA GROUP | 2.5V | 1.8V |
| 214 | 23 | NODE1/NCA GROUP | 2.5V | 1.8V |
| 215 | 24 | NODE2/NCA GROUP | 2.5V | 1.8V |
| 216 | 25 | NODE3/NCA GROUP | 2.5V | 1.8V |
| 217 | 26 | NODE4/NCA GROUP | 2.5V | 1.8V |

ADDRESS SWITCH (ASX) CHIP

FIG. 5

SERVICE PROCESSOR CONTROL OF MODULE I / O VOLTAGE LEVEL

BACKGROUND OF THE INVENTION

1. Technical Field

The present invention relates to an improved data processing system and, more particularly, to matching the reference voltage of interface chips to corresponding components.

2. Description of Related Art

Currently, many of the more complex computers that are used for services such as web servers are multiprocessor computers. These computers have many planars or large cards housing the major central electronics complex of the system. These systems may have several node planars housing multiple processors and associated components interacting with several memory planars and Input/Output planars which may be connected to one or more drawers holding adapters to various input/output devices or networks.

These systems often have a "service processor" that is used to perform many tasks that affect the computer as a whole, such as, for example, initializing the processors and support chips, and monitoring the temperature of the computer so that the exhaust fan may be turned on and off at appropriate times. The service processor may also monitor other resources within the system shared by the many different host operating systems that may be executing on the computer.

Systems such as these are very expensive, and are often updated with new parts or components rather than being completely scrapped in favor of a newer machine. However, often the next generation module or component, such as a processor, runs at a different voltage than its predecessor. Therefore, the interface between the new generation modules and the older ones is different. Current methods to solve this problem require that the entire planars in which the new generation module is to be placed be replaced or jumpers and redundant circuits are used to change the interface voltage to match the next generation module. However, such solutions are cumbersome and often expensive. It would be desirable to have a system in which the interface voltage is automatically modified to comply with the requirements of the next generation module that is placed into the system.

SUMMARY OF THE INVENTION

The present invention provides a method, system, and computer program for updating a reference voltage for a interface chip to a component of a data processing system. In one embodiment, a service processor reads the voltage requirements from a vital product data (VPD) module for each component within the data processing system and determines whether the voltage requirement for any component differs from a default voltage value. If any component has a voltage requirement that differs from the default value, then the service processor sends a signal to a JTAG controller or voltage selector within the interface chip corresponding to the affected component changing a register bit that results in the Input/Output drivers group corresponding to the affected component using a reference voltage that matched the requirements of the component rather than the default reference voltage.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3–5 depict tables listing examples of various JTAG Option register bit assignments for appropriate I/O drivers groups for the interface chips NCD, NCA, and ASX respectfully.

DETAILED DESCRIPTION OF THE PREFERRED EMBODIMENT

Figure 1:
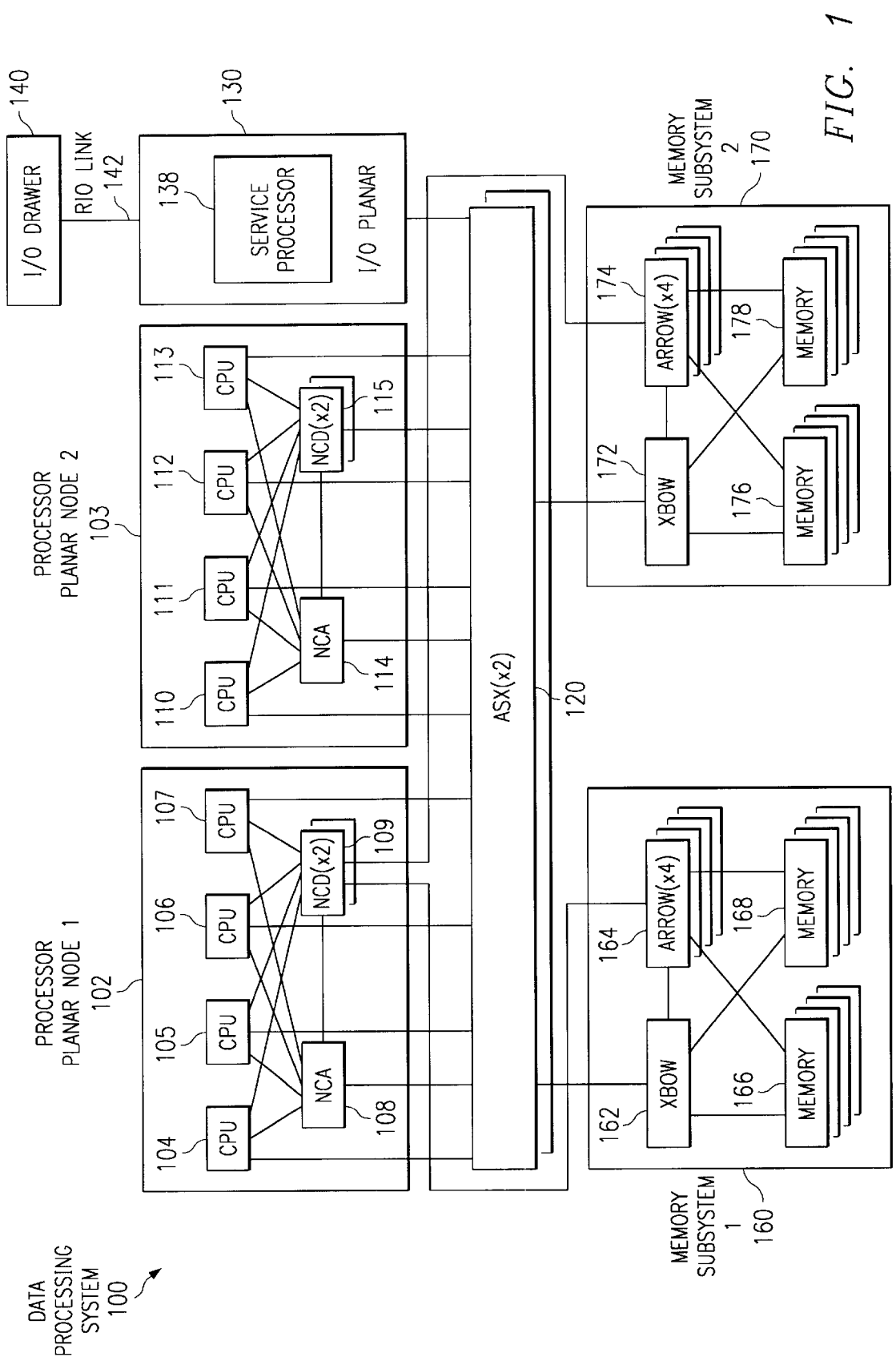
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 includes four planars: two processor planar nodes 1 and 2 102 and 103, one active system backplane (ABP) that contains two memory subsystems 1 and 2 160 and 170, and one I/O Planar 130. A planar, or large card, contains the major central electronics complex of the systems. To aid in understanding and simplify the illustration, not all connections between components are illustrated.

Each of processors planar nodes 1 and 2 102 and 103 has four processors 104–107 and 110–113 with an associated external level 2 cache (not depicted). Each processor planar node 102 and 103 contains one Node Controller Address (NCA) modules 108 and 114 and two Node Controller Data (NCD) modules 109 and 115 connecting the four processors 104–107 and 110–113 to the two memory subsystems 1 and 2 160 and 170 and to the I/O planar 130.

Each of the memory subsystems 1 and 2 160 and 170 contains two sets of controllers: one memory controller address (XBOW) module 162 and 172 and four memory controller data (ARROW) modules 164 and 174 in each set. Each memory subsystem 1 and 2 160 and 170 also contains two sets of memory planars 166 and 168 and 176 and 178. Each memory planar 166, 168, 176, and 178 contains two memory clock modules, memory address drivers, memory data multiplexers, and 32 connectors for memory Dual Inline Memory Modules (DIMM).

The I/O planar 130 contains logic to provide Input/Output capability to the data processing system 100. I/O planar 130 provides up to eight (8) serial high-speed Remote I/O (RIO) links. Each link 142 is connected to an external I/O subsystem 140 (also referred to as an I/O drawer). The I/O planar 130 also provides logic and physical connection to a high-speed switching cross bar to transfer data between processors in different physical frames. I/O planar 130 contains the service processor 138 and power control module (not shown), as well as an NCA module (not shown) and two NCD modules (not shown). The service processor 138 initializes and sets up major logic chips, such as, for example, processor 104, for system operation. The I/O driver voltage level of the interface chips (which will be described in more detail below) is set by the service processor 138 during system initialization to match those of the processors 104–107 and 110–113. The I/O planar 130 may also contain slots for I/O adapters.

In the present example, there are five major interface chips besides the processors 104–107 and 110–113. These other major interface chips are the node controller address (NCA) module 108, 114, and 134, the node controller data (NCD) module 109, 115, and 135, the two address switch (ASX) modules 120, the memory controller address (XBOW) module 162 and 172, and the memory controller data (ARROW) module 164 and 174.

The NCA module 108 and 114 connects the four (4) processors 104–107 and 110–113 to the memory subsystems 1 and 2 160 and 170 and to the I/O sub-system planar 130. The NCA module 108 and 114 does instruction pre-fetches, detects collisions, and creates a command dependency table for local commands. The NCA module 108 and 114 coordinates requests between the processors 104–107 and 110–113 and the ASX chips 120. The NCA module 108 and 114 also controls the data flow between four (4) processors and two (2) NCD modules 109 and 115. NCA I/O drivers are grouped corresponding to each processor and other interface chips to which it connects. The operating voltage of each group can be set to match those of the processor and other interface chips.

The NCD module 109 and 115 directs data between the four (4) processors 104–107 and 110–113 and the two memory controller data (Arrow) 164 and 174. There are two NCD modules 109 and 115 on each processor planar 102 and 103 for each NCA module 108 and 114 and four (4) processors 104–107 and 110–113. NCD I/O drivers are grouped corresponding to each processor and other interface chips to which it connects. The operating voltage of each I/O drivers group can be set to match those of the processor and other interface chips.

The ASX modules 120 controls snooping and command ordering. ASX I/O drivers are grouped corresponding to each processor and other interface chips to which it connects. The operating voltage of each I/O drivers group can be set to match those of the processor and other interface chips.

The XBOW module 162 and 172 controls access to Synchronous Dynamic Random Access Memory (SDRAM) and controls intervention between NCA modules 108 and 114. XBOW I/O drivers are grouped corresponding to each interface chip to which it connects. The operating voltage of each I/O drivers group can be set to match hose of the other interface chips.

The ARROW module 164 and 174 directs data between up to five (5) sets of NCD modules 109 and 115 and two memory planars 166–168 and 176–178. ARROW module 164 and 174 I/O drivers are grouped corresponding to each interface chip to which it connects. The operating voltage of each I/O drivers group can be set to match those of the other interface chips.

The service processor 138, in one embodiment, is an industry standard micro controller of the family 68307. Service processor 138 includes service processor code, the major functions of which are to initialize and setup the data processing system 100 from the time the data processing system 100 is powered on until the control is successfully transferred to the operating system. After that, the service processor continues to monitor voltage, temperature and performs error logging.

Some of the service processor 138 actions are described below. When the standby power is applied to the system, the service processor 138 checks if standby reset is successful and terminates if standby reset fails. Following the standby reset, service processor 138 does the following. It first performs a self-test and then check to determine if the correct major system components are present by reading the Vital Product Data (VPD). The service processor 138 then initializes the master clock chip and configures the non-volatile random access memory (NVRAM) to store system information. At this time, the service processor 138 also sets the fan speed to auto-speed, sets the environmental parameters, sets the serial port line speed, and enters standby phase, waiting for main power to be turned on.

When the system main power is turned on, the service processor 138 checks to determine if all power domains are on successfully. The service processor 138 then enters system bring-up phase, takes the system 100 out of reset, clears the environmental error log, and gets the system power status. At this time, the service processor 138 also initializes system logic components for operation, sets up component proper I/O voltage level. The service processor also performs memory tests, monitors power supplies, monitors fans, monitors temperatures, monitors voltage level, and monitors processor heartbeat.

After the operating system has been loaded, is running, and is in control of the system 100, the service processor 138 continues to perform the monitoring operations, such as, for example, monitoring power supplies, monitoring fans, monitoring temperatures, monitoring voltage levels, and monitoring processor heartbeat (surveillance).

Those of ordinary skill in the art will appreciate that the hardware depicted in FIG. 1 may vary. For example, additional processor planar nodes may be used in addition to the hardware depicted. The depicted example is not meant to imply architectural limitations with respect to the present invention.

Figure 2:
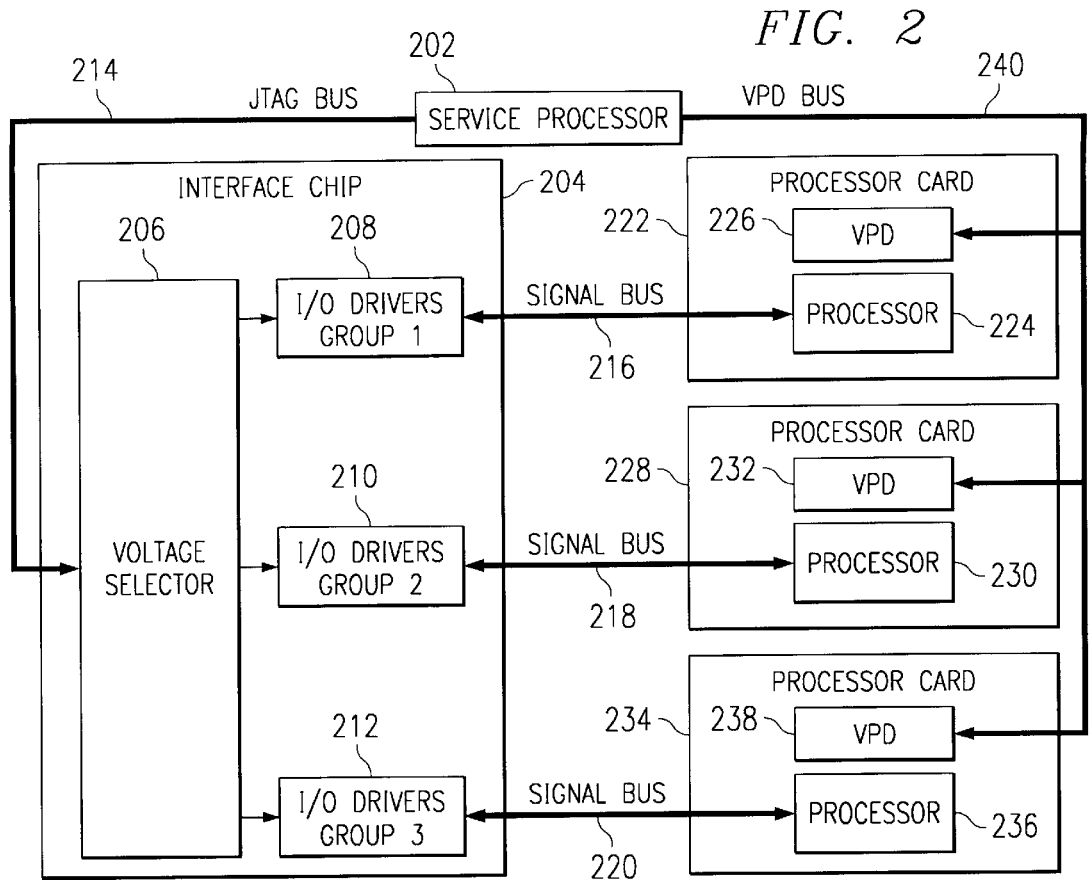
FIG. 2 depicts a block diagram illustrating a automatic voltage selection mechanism for matching the voltage level of the I/O drivers of an interface chip with that of the processors in accordance with the present invention.

With reference now to FIG. 2, a block diagram illustrating a automatic voltage selection mechanism for matching the voltage level of the I/O drivers of an interface chip with that of the processors is depicted in accordance with the present invention. The voltage selection system 200 may be implemented within a data processing system, such as, for example, data processing system 100 in FIG. 1, and comprises a service processor 202, an interface chip 204, and processor cards 222, 228, and 234. Service processor 202 may be implemented as service processor 138 in FIG. 1, interface chip 204 may be implemented as, for example, any one of interface chips 108–109, 114–115, 120, 162, 164, 172, and 174 in FIG. 1, and each of processor cards 222, 228, and 234 may be implemented as any one of processors 104–107 and 110–113 in FIG. 1.

Each processor card 222, 228, and 234 contains a processor 224, 230, and 236 and a vital product data (VPD) module 226, 232, and 238. Each VPD module 226, 232, and 238 contains the VPD, which are the information that identifies a Field-Replaceable-Unit (FRU) component in the system. The FRU can be, for example, a card or planar (larger card), a cable, sheet metal, or the chassis, that can be replaced as a unit in the field, i.e. customer location. Each VPD module 226, 232, and 238 is typically implemented as a 256-byte electrically programmable memory module. The data stored in the VPD module includes the FRU numbers, part numbers, engineering change level, compatibility options, serial numbers, component signatures, operating voltage level and other information relating to such things as, for example, serviceability and error logging. The VPD data are generally accessed by service processor 202 through VPD bus 240. The data within each of VPD modules 226, 232, and 238 is used by the service processor 202 to initialize components in the system relating to such items as, for example, operating frequency, compatibility, and operating voltage setting.

Interface chip 204 includes a voltage selector 206 implemented as a JTAG controller and I/O drivers groups 1–3 208–212 for driving each of processors 224, 230, and 236. The interface chip 204 connects processors to other logic chips, i.e. memory controller. Although in FIG. 1, the data flow between interface chips and logic chips is depicted, FIG. 2 merely depicts the voltage control and not the data flow between the interface chip and other logic chips.

The signals on signal buses 216–220 that connect the interface chip 204 to processors 224, 230, and 236 are driven by a set of logic facilities called I/O drivers 208–212. These signals can be bi-directional or uni-directional. The voltage level of these drivers 208–212 is normally the same as that of the supply voltage of the processor chips 224, 230, or 236 to which the drivers 208–212 communicates. However, in the present invention, the voltage level of each voltage signal delivered by a respective one of drivers 208–210 across a respective one of signal buses 216–220 is programmable. This feature is desirable since it is increasingly common that next generation modules, such as a new processor, run at a different voltage than its predecessor.

Therefore, for example, suppose that processor cards 228 and 234 are older processor cards running on 2.5 volts and that processor card 222 is a new processor card that has been placed into the data processing system. Suppose further that processor card 222 is a new generation of processors that runs on 1.8 volts. Service processor 202 collects VPD data from VPD module 226 to determine the voltage requirements of the new processor card 222.

Each of I/O drivers groups 1–3 208–212 has a selecting input to select either a 1.8 volt reference level or a 2.5 volt reference level. This selecting input is defaulted to "0" for a 2.5 volt reference level and is set to "1" for a 1.8 volt reference level. The service processor 202 uses the JTAG bus 214 to change the logic value of the I/O driver voltage selecting input for I/O driver group 1 208 to "1" corresponding to 1.8 volts.

The JTAG bus 214 interface (or boundary scan interface) is the implementation of the IEEE 1149.1 standard. The JTAG bus 214 interface uses a small number of wires, an internal state machine, an instruction register, and a set of data registers. The JTAG bus 214 interface allows an external application function to send instruction and data to a chip, and allows data and status to be scanned out of a chip. Data scanned in can be for setup, initialization, and functional selections. Data scanned out of a chip may be used, for example, functionally, in an interconnection test, or a built-in test. The JTAG bus 214 interface includes a scan-in (TDI), a scan-out (TDO), and a clock (TCK). The JTAG bus 214 interface also includes a TMS input, which selects a chip (or a group of chips) for scan operations and indicates whether the scan is for instructions (command) or for data scanned into the chip.

In the context of the present invention, the voltage selector 206 is a JTAG controller or interface. The voltage select inputs of the programmable I/O drivers groups 208–212 are connected to the outputs of the voltage selector (JTAG controller) 206 Option Register. The values of these appropriate bits in the voltage selector 206 register are defaulted to "0" at power up, which indicated 2.5 voltage reference for assigned I/O groups. At power-up, the service processor 202 checks for processor working voltage through each processor card's 222, 228, and 234 VPD module 226, 232, and 238. If the processor working voltage is 2.5 volts, the service processor 202 does not need to set the I/O drivers 208–212 voltage level as it is defaulted to 2.5 volts. However, as in the example discussed above, if the processor working voltage is 1.8 volts, the service processor 202 scans a "1" value to the appropriate bits in the Option Register to set the I/O reference voltage to 1.8 volts for that group. Thus, in the example described above, the reference voltage for I/O drivers group 1 208 is changed to 1.8 volts.

Tables in FIGS. 3–5 depict list examples of various JTAG Option register bit assignments for appropriate I/O drivers groups for the interface chips NCD, NCA, and ASX respectfully.

Those of ordinary skill in the art will appreciate that the hardware depicted in FIG. 2 may vary. For example, voltage levels may be determined and set for devices other than processors, such as, for example, memory devices. Furthermore, the present invention is not limited to selection between two voltages nor is it limited to the specific values of 1.8 volts and 2.5 volts discussed above. Also, the values depicted in the tables in FIGS. 3–5 are merely given as examples, other values may be used depending on implementation. The depicted example is not meant to imply architectural limitations with respect to the present invention.

Figure 6:
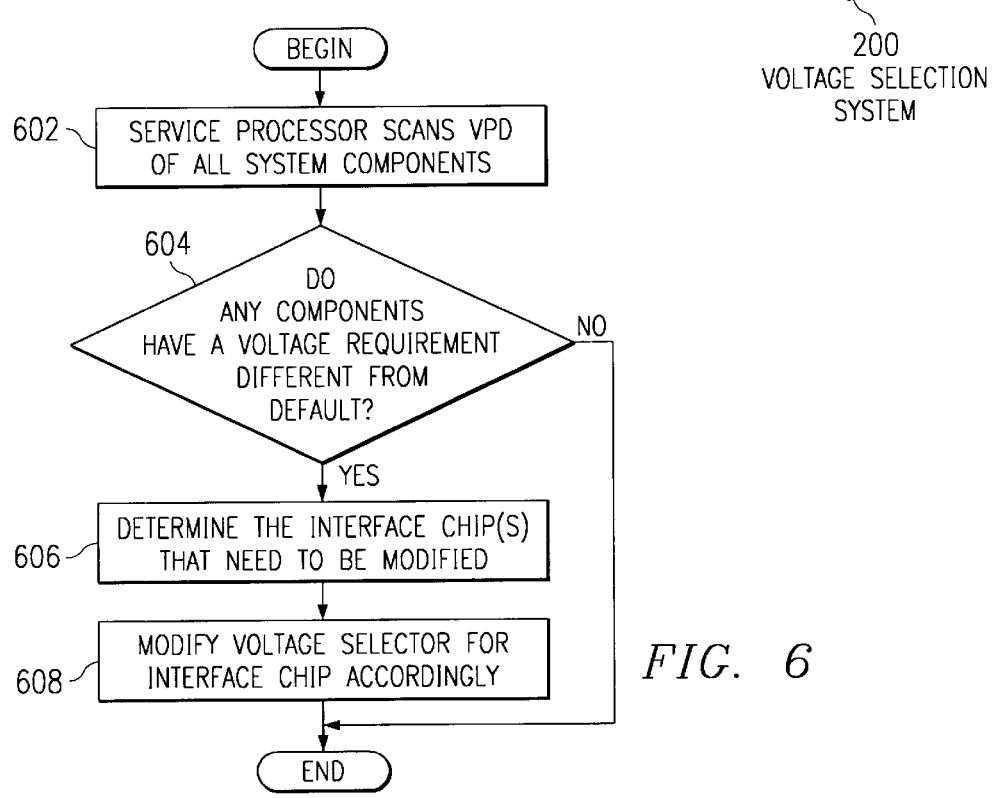
FIG. 6 depicts a flowchart illustrating an exemplary process for automatically modifying the voltage reference for interface chips in accordance with the present invention.

With reference now to FIG. 6, a flowchart illustrating an exemplary process for automatically modifying the voltage reference for interface chips is depicted in accordance with the present invention. During initialization, the service processor scans the VPD of each component within the data processing system to determine the voltage requirements of each component (step 602). The service processor then determines whether any of the components have a voltage requirement that differs from the default value for the data processing system (step 604). For example, if the default value is 2.5 volts and the service processor discovers a processor that requires 1.8 volts, this value differs from the default value and the interface chip will need to be modified accordingly.

If no components voltage requirements differ from the default value for the system, then no modification of any of the interface chips is necessary. However, if one or more components voltage requirements are different from the default value, then the service processor determines the interface chip(s) that needs to be modified (step 606). The service processor then sends a signal or signals over the JTAG bus to the appropriate one or more interface chips to modify the appropriate voltage select signals of the appropriate I/O drivers group(s) (step 608). Thus, the I/O drivers group(s) that interact with the affected component are configured to use the appropriate reference voltage for communications with the affected component.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of updating a reference voltage for an interface chip operable to transfer data to a component; the method comprising:

determining if a voltage requirement for the component differs from a default voltage value; and modifying a reference voltage output of the interface chip corresponding to the component to facilitate data transfer from the interface chip to the component.

2. The method as recited in claim 1, wherein the step of determining the voltage requirement of the component comprises reading a vital product data module on the component.

3. The method as recited in claim 1, wherein the determining step and the modify step are performed by a service processor.

4. A method of updating a reference voltage for an interface chip to a component; the method comprising:
determining if a voltage requirement for the component differs from a default voltage value; and
modifying a reference voltage output of the interface chip corresponding to the component, wherein the step of modifying the reference voltage comprises sending a voltage select signal to a I/O drivers group within an appropriate interface, wherein the I/O drivers group corresponds to the component.

5. A method of updating a reference voltage for a interface chip to a component; the method comprising:
determining if a voltage requirement for the component differs from a default voltage value; and
modifying a reference voltage output of the interface chip corresponding to the component, wherein the step of modifying the reference voltage output of the interface comprises scanning in a signal to a JTAG controller option register bit to change the register bit to a value that corresponds to the voltage requirement of the component, wherein an output of the JTAG controller is coupled to a voltage selection input of an I/O drivers group within the interface, the I/O drivers group corresponding to the component.

6. A computer program product in a computer readable media for use in a data processing system for updating a reference voltage for an interface chip operable to transfer data to a component within the data processing system; the computer program product comprising:
first instructions for determining if a voltage requirement for the component differs from a default voltage value; and
second instructions for modifying a reference voltage output of the interface chip corresponding to the component to facilitate data transfer from the interface chip to the component.

7. The computer program product as recited in claim 6, wherein the first instructions comprise reading a vital product data module on the component.

8. The computer program product as recited in claim 6, wherein the first and second instructions are performed by a service processor.

9. A computer program product in a computer readable media for use in a data processing system for updating a reference voltage for an interface chip to a component within the data processing system; the computer program product comprising:
first instructions for determining if a voltage requirement for the component differs from a default voltage value; and
second instructions for modifying a reference voltage output of the interface chip corresponding to the component, wherein second instructions comprise sending a voltage select signal to a I/O drivers group within an appropriate interface, wherein the I/O drivers group corresponds to the component.

10. A computer program product in a computer readable media for use in a data processing system for updating a reference voltage for an interface chip to a component within the data processing system; the computer program product comprising:
first instructions for determining if a voltage requirement for the component differs from a default voltage value; and
second instructions for modifying a reference voltage output of the interface chip corresponding to the component, wherein second instructions comprise scanning in a signal to a JTAG controller option register bit to change the register bit to a value that corresponds to the voltage requirement of the component, wherein an output of the JTAG controller is coupled to a voltage selection input of an I/O drivers group within the interface, the I/O drivers group corresponding to the component.

11. A system for updating a reference voltage for an interface chip operable to transfer data to a component within a data processing system; the system comprising:
first means for determining if a voltage requirement for the component differs from a default voltage value; and
second means for modifying a reference voltage output of the interface chip corresponding to the component to facilitate data transfer from the interface chip to the component.

12. The system as recited in claim 11, wherein the first means comprise reading a vital product data module on the component.

13. The system as recited in claim 11, wherein the first and second means are performed by a service processor.

14. A system for updating a reference voltage for an interface chip to a component within a data processing system; the system comprising:
first means for determining if a voltage requirement for the component differs from a default voltage value; and
second means for modifying a reference voltage output of the interface chip corresponding to the component, wherein second means comprise sending a voltage select signal to a I/O drivers group within an appropriate interface, wherein the I/O drivers group corresponds to the component.

15. A system for updating a reference voltage for an interface chip to a component within a data processing system; the system comprising:
first means for determining if a voltage requirement for the component differs from a default voltage value; and
second means for modifying a reference voltage output of the interface chip corresponding to the component, wherein second means comprise scanning in a signal to a JTAG controller option register bit to change the register bit to a value that corresponds to the voltage requirement of the component, wherein an output of the JTAG controller is coupled to a voltage selection input of an I/O drivers group within the interface, the I/O drivers group corresponding to the component.

* * * * *